United States Patent
De Somer et al.

[15] 3,679,795

[45] July 25, 1972

[54] ANTIINFECTIOUS COMPOSITIONS AND PROCESS FOR THEIR PREPARATION

[72] Inventors: Pierre De Somer, Louvain; Paul Claes, Heverlee, both of Belgium

[73] Assignee: Recherche Et Industrie Therapeutiques, R.I.T., Genval, Belgium

[22] Filed: June 4, 1970

[21] Appl. No.: 43,571

[30] Foreign Application Priority Data

June 17, 1969 Belgium....................................30,722
June 17, 1969 Belgium....................................63,598

[52] U.S. Cl............................................................424/180

[51] Int. Cl. .......................................................A61k 27/00
[58] Field of Search................................................424/180

Primary Examiner—Richard L. Huff
Attorney—William H. Edgerton, Richard D. Foggio, Joan S. Keps, Alan D. Lourie and Joseph A. Marlino

[57] ABSTRACT

The invention relates to the preparation of antiviral polyacetalcarboxylic acids and to the physiologically acceptable salts thereof, said polyacetalcarboxylic acids being oxidized polysaccharides having at least 50 percent of the monosaccharide rings open, substantially all the open rings oxidized to the carboxylic acid state and substantially all the C-O-C linkages originally present in the original polysaccharide still intact.

9 Claims, No Drawings

ANTIINFECTIOUS COMPOSITIONS AND PROCESS FOR THEIR PREPARATION

The invention also relates to the pharmaceutical compositions containing said oxidized polysaccharides and their use for treating infections.

The present invention relates to the preparation of antiviral polyacetalcarboxylic acids and to the physiologically acceptable salts thereof, said polyacetalcarboxylic acids being oxidized polysaccharides having at least 50 percent of the monosaccharide rings open, substantially all the open rings oxidized to the carboxylic acid state and substantially all the C-O-C linkages originally present in the original polysaccharide still intact.

"The term 'antiviral' includes viruses such as influenza, smallpox, foot-and-mouth and hog cholera."

For the preparation of the polyacetalcarboxylic acids used as antiviral compositions in this invention, any of the commonly available polysaccharides may be used. For instance, the polyacetalcarboxylic acid may be derived from starch and other glucans as for instance amylose, amylopectin, starch dextrins, glycogen and dextrans; fructans; mannans; galactans, polyuronides as for instance pectic acid and alginic acid; neutral complex polysaccharides such as for instance arabinogalactans, galactomannans and glucomannans; acidic complex polysaccharides as for instance plant gums and heparin and amino polysaccharides and their derivatives. Among these possible starting materials, the preferred ones are those yielding carboxy derivatives which are either degradable in the organism or excreted by the organism.

It has been found that for presenting substantial antiviral activity, at least 50 and preferably at least 60 percent of the monosaccharide rings should be opened. Under oxidation conditions, these rings break at carbon-carbon bonds, the degree of oxidation depending on the reaction conditions.

For instance, in the case of a 1,4-polyglycan, the pyranose ring opens between positions 2 and 3 to give a copolymer of the following formula I

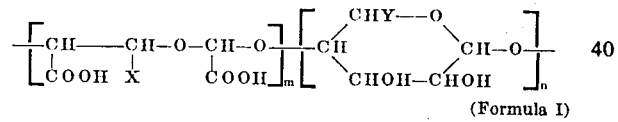

(Formula I)

wherein either X is equivalent to Y and represents COOH, CH₂OH or X and Y represent chains of the following general formula (A)

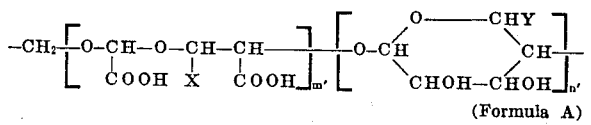

(Formula A)

or X is different from Y, one of them representing CH₂OH and the other one representing either a chain of the above general formula (A) or (Unit B)

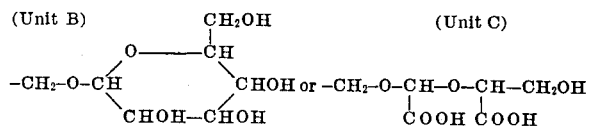

(Unit C)

and m and n which are identical with or different from m' and n' represent molar fractions comprised between 0.5 and 1 and between 0.5 and 0 respectively and, preferably, between 0.6 and 1 and 0.4 and 0 respectively.

Compounds of formula I wherein X and Y are CH₂OH are obtained for instance from amylose, cellulose, galactan and ivory nut mannan.

Compounds of formula I wherein X and Y are COOH are obtained for instance from polygalacturonic acid and alginic acid.

Compounds of formula I wherein X and Y are identical or different and represent either CH₂OH or the above defined chain A are obtained for instance from amylopectin, glycogen and yeast mannan.

Compounds of formula I wherein X and Y are different, one of them representing CH₂OH and the other one representing either the above defined unit B or the above defined unit C are obtained for instance from guaran.

In the case of a 1,6-polyglycan such as dextran, the ring opens between positions 2,3 and 4, to give (as far as 1 → 3 and 1 → 4 branchings are not involved) a chain of the following formula II

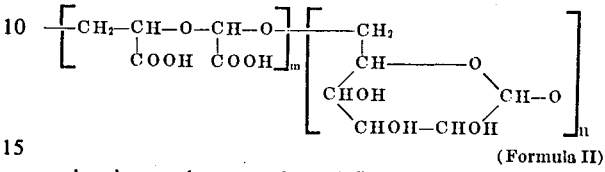

(Formula II)

wherein m and n are as above defined.

The antiviral polyacetalcarboxylic acids of this invention are prepared by oxidation carried out in two stages, the first cleaving the monosaccharide ring to yield a di-aldehyde and the second oxidizing each aldehyde group to the carboxylic acid state.

The first stage is carried out using ortho- or meta-periodic acid or an alkaline salt thereof or any usual glycol cleaving agent such as lead tetra-acetate, sodium bismuthate or ruthenium tetra-oxide.

The second stage is carried out using a chlorite, a bromite, dinitrogen tetroxide, bromine, chlorine, a hypochlorite or hypobromite; the preferred ones being chlorite and bromite which convert substantially all the opened rings to the carboxylic acid state and leave the C-O-C linkages substantially intact.

It has been found that the degree of antiviral activity of the different oxidized polysaccharides is depending on the nature of the starting polysaccharide and on the molecular weight of the obtained oxidized polysaccharide. For instance, polygalacturonic acid has been found a less attractive starting material than amylose and among the oxidized dextrans which were obtained by the same oxidation method from dextrans having a molecular weight of 150,000, 500,000 and 2,000,000, respectively there has been noticed an increasing antiviral activity with increasing molecular weight of the starting material.

The lowest acceptable molecular weight of the oxidized polysaccharide for the purpose of this invention is estimated at about 5,000.

For their administration as antiviral compositions, the obtained polyacetalcarboxylic acids are preferably neutralized to yield physiologically acceptable salts thereof and these physiologically acceptable salts — most preferred ones being the sodium and potassium salts — are within the scope of the invention.

For treating an infection caused by agents which depend upon intracellular replication, an effective amount of the oxidized polysaccharide having at least 50 percent of the monosaccharide rings open, substantially all the open rings oxidized to the carboxylic acid state, and substantially all the C-O-C linkages originally present in the original polysaccharide still intact, is preferably administered to a susceptible warm blood animal in the form of compositions comprising said oxidized polysaccharide plus a pharmaceutical carrier.

Optionally, other medicaments — preferably antigens, antiviral or antiprotozoal drugs — may be included in the above said pharmaceutical carrier.

Thus, for preparing antiviral polyacetalcarboxylic acids according to this invention, a polysaccharide is oxidized under conditions which open at least 50 percent and preferably at least 60 percent of the monosaccharide ring units and convert the opened rings to the carboxylic acid state while leaving the C-O-C linkages originally present in the polysaccharide substantially intact and optionally reacting the resulting polyacetalcarboxylic acid with a basic compound — preferably an alkali metal hydroxide to convert the carboxyl groups into the form of a physiologically acceptable salt.

Therefore, the polysaccharide is oxidized first with a glycol cleaving agent — such as lead tetra-acetate, sodium bismuthate, ruthenium tetra-oxide or, preferably, an ortho or meta periodic acid or an alkali metal salt thereof, to open the monosaccharide ring units and convert them to the di-aldehyde state and then with either a chlorite, or a bromite, or — but less preferably — with either chlorine, bromine or dinitrogen tetroxide, or a hypochlorite or hypobromite to oxidize the resulting aldehyde groups to carboxylic acid groups.

A further aspect of the invention comprises pharmaceutical compositions comprising a polyacetalcarboxylic acid or preferably a physiologically acceptable salt thereof, as defined above together with a pharmaceutically acceptable carrier.

Therefore, the polyacetalcarboxylic acids or preferably the physiologically acceptable salts thereof as described above are incorporated into a pharmaceutical composition in dosage unit form containing an effective but non toxic amount of the active oxidized polysaccharide. Such compositions are combined with pharmaceutical carriers for administration by oral, sublingual, nasal, ocular or parenteral route according to procedures known to the art, the dose being from 10 to 100 mg per kg of weight for the systemic administration routes. They are administered at intervals depending upon the nature of the infection of interest and upon the administration route. The oxidized polysaccharides are possibly administered orally as tablets or capsules, but preferably parenterally as a solution or suspension or intranasally as drops or spray, or intraocularly as drops. As indicated above, other medicaments may be incorporated in the said pharmaceutical carriers. For instance, oxidized amylose, i.e. a linear condensation copolymer containing 1,4-linked anhydro-alpha-D-glucopyranose units and 1,4-linked anhydro-1,4-dihydroxy-1,4-dicarboxy-3-hydroxymethyl-2-oxabutane units; oxidized amylopectin, i.e. a branched condensation copolymer containing 1,4 and 1,6-linked anhydro-alpha-D-glucopyranose units and 1,4-linked anhydro-1,4-dihydroxy-1,4-dicarboxy-3 -hydroxy-methyl-2-oxabutane units; oxidized polygalacturonic acid, i.e. a linear condensation copolymer containing 1,4-linked anhydro-alpha-D-galacturonopyranose units and 1,4-linked anhydro-1,4-dihydroxy-1,3,4-tricarboxy-2-oxabutane units; oxidized alginic acid, i.e. a linear condensation copolymer containing 1,4-linked anhydro-beta-D-mannuronopyranose units, 1,4-linked anhydro-alpha-L-guluronopyranose units and 1,4-linked anhydro-1,4-dihydroxy-1,3,4-tricarboxy-2-oxabutane units; oxidized cellulose, i.e. a linear condensation copolymer containing 1,4-linked-beta-D-glucopyranose units and 1,4-linked anhydro-1,4-dihydroxy-1,4-dicarboxy-3-hydroxymethyl-2-oxabutane units and oxidized dextran, i.e. a condensation copolymer containing 1,6-linked-alpha-D-glucopyranose units and 1,4-linked anhydro-1,4-di-hydroxy-1,3-dicarboxy-2-oxabutane units; oxidized guaran, i.e. a condensation copolymer consisting of a linear chain of 1,4-linked anhydro-beta-D-mannopyranose units and 1,4-linked anhydro-1,4-dihydroxy-1,4-dicarboxy-3-hydroxy-methyl-2-oxabutane units with alpha-D-galactopyranosyl- and 4-hydroxy-1,3-dicarboxy-2-oxabutyl units as substituants of half of the hydroxymethyl functions of the main chain have demonstrated antiinfectious activity when administered intravenously or intraperitoneally to test animals (mice). The administration of aqueous solutions of the sodium salts at dosages ranging from 0.5 to 2 mg - i.e. far below the toxicity level - provided protection of the animal against viral infection (vaccinia tail lesion test and/or Mengo virus protection test), the starting materials as well as the oxidized polysaccharides presenting an oxidation degree inferior to 50 percent (i.e. for which $m \leq 0.5$) being inactive.

In the following non limitative examples, the oxidation degree of the polysaccharide which determines the molar ratio of oxidized monosaccharide units vs non oxidized monosaccharide units is obtained from the determination of the dialdehyde content of the intermediate compound, at the end of stage I, i.e. after the periodate oxidation step; since the second stage oxidation quantitatively converts the aldehyde groups present into carboxyl groups, the oxidation degree (expressed in percent) is the same for the aldehyde derivative and for the carboxylic derivative.

EXAMPLE I

A solution of 15.8 g of sodium metaperiodate in 200 ml of water is added with stirring to a suspension of 10 g of amylose (dry basis) in 200 ml of water. The slurry is stirred in the dark at 0° C under nitrogen atmosphere. At regular intervals, the consumption of periodate is determined by the method of P.F.Fleury and J.Lange (J.Pharm.Chim. 17, 107 and 196 (1933)). As soon as the periodate concentration is stabilized (i.e. after 64 hrs), the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 93 percent determined by the oxime method (E.K.Gladding and C.B.Purves, Tappi, 116, 150 (1943)).

A 8 g (dry basis) aliquot of the periodate oxidized amylose is suspended in a mixture of 400 ml of water, 45 g of commercial grade sodium chlorite (80 percent) and 11.4 ml of glacial acetic acid. The suspension is stirred for 3 hrs at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 2,900 ml of absolute ethanol. The precipitate is dissolved in 75 ml of water and poured into 550 ml of absolute ethanol. The gummy precipitate is dissolved in 150 ml of water and freeze dried to yield the sodium salt of a linear condensation copolymer containing 1,4-linked anhydro-alpha-D-glucopyranose units and 1,4-linked anhydro-1,4-dihydroxy-1,4-dicarboxy-3-hydroxymethyl-2-oxabutane units with a milli-equivalent COONa/g : 8.05 and an intrinsic viscosity $[\eta]$ : 0.75 (in 0.2N NaOH at 30.3° C) expressed in deciliter per gram.

EXAMPLE 2

A solution of 15.8 g of sodium metaperiodate in 200 ml of water is added with stirring to a suspension of 10 g of amylose (dry basis) in 200 ml of water. The slurry is stirred in the dark at 10° C under nitrogen atmosphere. At regular intervals, the consumption of periodate is determined by the method of P.F.Fleury and J.Lange (J.Pharm.Chim.loc.cit.).

As soon as the periodate concentration is stabilized (i.e. after 64 hrs), the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 98 percent determined by the oxime method (E.K.Gladding et al, loc.cit.).

A 8 g (dry basis) aliquot of the periodate oxidized amylose is suspended in a mixture of 400 ml of water, 45 g of commercial grade sodium chlorite (80 percent) and 11.4 ml of glacial acetic acid. The suspension is stirred for 3 hrs at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 2900 ml of absolute ethanol. The precipitate is dissolved in 75 ml of water and poured into 550 ml of absolute ethanol. The gummy precipitate is dissolved in 150 ml of water and freeze dried to yield the sodium salt of a linear condensation copolymer containing 1,4-linked anhydro-alpha-D-glucopyranose units and 1,4-linked anhydro-1,4-dihydroxy-1,4-dicarboxy-3-hydroxymethyl-2-oxabutane units with a milli-equivalent COONa/g : 8.36 and an intrinsic viscosity $[\eta]$ : 0.14 (in 0.2N NaOH at 30.3° C) expressed in deciliter per gram.

EXAMPLE 3

A solution of 26.5 g of sodium metaperiodate in 300 ml of water is added with stirring to a suspension of 10 g of amylose (dry basis) in 100 ml of water. The pH is adjusted to 1 with normal hydrochloric acid. The slurry is stirred in the dark at room temperature under nitrogen atmosphere. At regular intervals, the consumption of periodate is determined by the method of P.F.Fleury and J.Lange(J.Pharm. Chim.,loc.cit.).After a 3 hrs reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 88 percent determined by the oxime method (E.K. Gladding et al., loc. cit.).

A 8 g (dry basis) aliquot of the periodate oxidized amylose is suspended in a mixture of 400 ml of water, 45 g of commercial grade sodium chlorite (80 percent) and 11.4 ml of glacial acetic acid. The suspension is stirred for 3 hrs at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 3 l of absolute ethanol. The precipitate is dissolved in 100 ml of water and poured into 700 ml of absolute ethanol. The gummy precipitate is dissolved in 150 ml of water and freeze dried to yield the sodium salt of a linear condensation copolymer containing 1,4-linked anhydro-alpha-D-glucopyranose units and 1,4-linked anhydro-1,4-dihydroxy-1,4-dicarboxy-3-hydroxymethyl-2-oxabutane units with a milli-equivalent COONa/g : 7.75 and an intrinsic viscosity [$\eta$] : 0.74 (0.2N NaOH at 30.3° C) expressed in deciliter per gram.

EXAMPLE 4

A solution of 13.25 g of sodium metaperiodate in 300 ml of water is added with stirring to a suspension of 10 g of amylose (dry basis) in 100 ml of water. The pH is adjusted to 1 with normal hydrochloric acid. The slurry is stirred in the dark at room temperature under nitrogen atmosphere. At regular intervals, the consumption of periodate is determined by the method of P.F. Fleury and J. Lange (J. Pharm. Chim., loc. cit.). After a 2 hours reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 74 percent determined by the oxime methode (E.K. Gladding et al., loc. cit.).

A 8 g (dry basis) aliquot of the periodate oxidized amylose is suspended in a mixture of 400 ml of water, 45 g of commercial grade sodium chlorite (80 percent) and 11.4 ml of glacial acetic acid. The suspension is stirred for 4 hrs at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 3 l of absolute ethanol. The precipitate is dissolved in 100 ml of water and poured into 700 ml of absolute ethanol. The gummy precipitate is dissolved in 150 ml of water and freeze dried to yield the sodium salt of a linear condensation copolymer containing 1,4-linked anhydro-alpha-D-glucopyranose units and 1,4-linked anhydro-1,4-dihydroxy-1,4-dicarboxy-3-hydroxymethyl-2-oxabutane units with a milli-equivalent COONa/g : 6.82 and an intrinsic viscosity [$\eta$] : 1.05 (in 0.2N NaOH at 30.3° C) expressed in deciliter per gram.

EXAMPLE 5

A solution of 19.87 g of sodium metaperiodate in 300 ml of water is added with stirring to a suspension of 10 g of amylose (dry basis) in 100 ml of water. The pH is adjusted to 1 with normal hydrochloric acid. The slurry is stirred in the dark at room temperature under nitrogen atmosphere. At regular intervals, the consumption of periodate is determined by the method of P.F. Fleury and J. Lange (J. Pharm. Chim., loc. cit.). After a 2 hours reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 81 percent determined by the oxime method (E.K. Gladding et al., loc.cit.).

A 8 g (dry basis) aliquot of the periodate oxidized amylose is suspended in a mixture of 400 ml of water, 45 g of commercial grade sodium chlorite (80 percent) and 11.4 ml of glacial acetic acid. The suspension is stirred for 4 hrs at room temperature. After this reaction period, nitrogen is bubbled through the reaction mixture to remove the chlorine dioxide. The pH of the solution is adjusted to 8.3 with aqueous sodium hydroxide (2N) and filtered. The filtrate is poured with stirring into 3 l of absolute ethanol. The precipitate is dissolved in 100 ml of water and poured into 700 ml of absolute ethanol. The gummy precipitate is dissolved in 150 ml of water and freeze dried to yield the sodium salt of a linear condensation copolymer containing 1,4-linked anhydro-alpha-D-glucopyranose units and 1,4-linked anhydro-1,4-dihydroxy-1,4-dicarboxy-3-hydroxymethyl-2-oxa-butane units with a milliequivalent COONa/g : 7.3 and an intrinsic viscosity[$\eta$] : 0.87 (in 0.2N NaOH at 30.3° C) expressed in deciliter per gram.

EXAMPLE 6

A solution of 9.94 g of sodium metaperiodate in 300 ml of water is added with stirring to a suspension of 10 g of amylose (dry basis) in 100 ml of water. The pH is adjusted to 1 with normal hydrochloric acid. The slurry is stirred in the dark at room temperature under nitrogen atmosphere. At regular intervals, the consumption of periodate is determined by the method of P.F. Fleury and J. Lange (J. Pharm. Chim., loc. cit.). After a two hours reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 64 percent determined by the oxime method (E.K. Gladding et al., loc. cit.).

A 8 g (dry basis) aliquot of the periodate oxidized amylose is suspended in a mixture of 400 ml of water, 45 g of commercial grade sodium chlorite (80 percent) and 11.4 ml of glacial acetic acid. The suspension is stirred for 4 hrs at room temperature. After this reaction period, nitrogen is bubbled through the reaction mixture to remove the chlorine dioxide. The pH of the solution is adjusted to 8.3 with aqueous sodium hydroxide (2N). The gelatinous precipitate is removed by centrifugation and the supernatant is poured with stirring into 3 l of absolute ethanol.

The precipitate is dissolved in 100 ml of water and poured into 700 ml of absolute ethanol. The gummy precipitate is dissolved in 150 ml of water and freeze dried to yield the sodium salt of a linear condensation copolymer containing 1,4-linked anhydro-alpha-D-glucopyranose 1,4-dihydroxy-1,4-dicarboxy-3-hydroxymethyl-2-oxabutane units with a milli-equivalent COONa/g : 6.1 and an intrinsic viscosity [$\eta$] : 1.4 (in 0.2 N NaOH at 30.3° C) expressed in deciliter per gram.

EXAMPLE 7

A solution of 33.125 g of sodium metaperiodate in 300 ml of water is added with stirring to a suspension of 10 g of amylose (dry basis) in 100 ml of water. The pH is adjusted to 1 with normal hydrochloric acid. The slurry is stirred in the dark at room temperature under nitrogen atmosphere. At regular intervals, the consumption of periodate is determined by the method of P.F. Fleury and J. Lange (J. Pharm. Chim., loc. cit.). After a four hours reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 98 percent determined by the oxime method (E.K. Gladding et al., loc.cit.).

A 8 g (dry basis) aliquot of the periodate oxidized amylose is suspended in a mixture of 400 ml of water, 45 g of commercial grade sodium chlorite (80 percent) and 11.4 ml of glacial acetic acid. The suspension is stirred for 3 hrs at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 3 l of absolute ethanol. The precipitate is dissolved in 100 ml of water and poured into 700 ml of absolute ethanol. The gummy precipitate is dissolved in 150 ml of water and freeze dried to yield the sodium salt of a linear condensation copolymer containing 1,4-linked anhydro-alpha-D-glucopyranose units and 1,4-linked anhydro-1,4-dihydroxy-1,4-dicarboxy-3-hydroxymethyl-2-oxabutane units with a milli-equivalent COONa/g : 8.36 and an intrinsic viscosity $[\eta]$ : 0.84 (in 0.2N NaOH at 30.3° C) expressed in deciliter per gram.

EXAMPLE 8

A solution of 15.8 g of sodium metaperiodate in 200 ml of water is added with stirring to a solution of 8.77 g of amylopectin in 200 ml of water.

The solution is stirred in the dark at 0° C under nitrogen atmosphere. At regular intervals, the consumption of periodate is determined by the method of P.F. Fleury and J. Lange (J. Pharm. Chim., loc. cit.). As soon as the periodate concentration is stabilized (i.e., after 40 hrs), the residual periodate is reduced by addition of an equivalent amount of ethylene glycol. After a 3 hours reaction period, the solution is dialyzed against water at 5° C, concentrated under reduced pressure at 15° C to a volume of 150 ml. By addition of 300 ml of t-butylalcohol, there is obtained a precipitate which is triturated with absolute ethanol, filtered and dried under reduced pressure to yield periodate oxidized amylopectin having an oxidation degree of 90 percent determined by the sodium borohydride method J.C. Rankin and C.L. Mehltretter, Anal. Chem. 28, 1012, 1956).

A 3.8 g (dry basis) aliquot of the periodate oxidized amylopectin is suspended in a mixture of 200 ml of water, 45 g of commercial grade sodium chlorite (80 percent) and 12 ml of glacial acetic acid. The suspension is stirred for 4 hrs at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 1500 ml of absolute ethanol. The precipitate is dissolved in 80 ml of water and poured into 550 ml of absolute ethanol.

The gummy precipitate is dissolved in 200 ml of water and freeze dried to yield the sodium salt of a branched condensation copolymer containing 1,4 and 1,6-linked anhydro-alpha-D-glucopyranose units and 1,4-linked anhydro-1,4-dihydroxy-1,4-dicarboxy-3-hydroxymethyl-2-oxabutane units with a milli-equivalent COONa/g : 7.89 and an intrinsic viscosity $[\eta]$ : 0.75 (in 0.2 N NaOH at 30.3° C) expressed in deciliter per gram.

EXAMPLE 9

A solution of 5.9 g of sodium metaperiodate in 150 ml of water is added with stirring to a solution of 5.1 g of polygalacturonic acid (dry basis) in 50 ml of water.

The solution is stirred in the dark at 0° C under nitrogen atmosphere. At regular intervals the consumption of periodate is determined b the method of P.F. Fleury and J. Lange (J. Pharm. Chim., loc. cit.). As soon as the periodate concentration is stabilized (i.e., after 42 hrs), the residual periodate is reduced by addition of an equivalent amount of ethylene glycol. After a 3 hours reaction period, the solution is dialyzed against water at 5° C, concentrated under reduced pressure at 15° C to a volume of 100 ml. By addition of 250 ml of t-butylalcohol, there is obtained a precipitate which is triturated with absolute ethanol, filtered and dried under reduced pressure to yield periodate oxidized polygalacturonic acid having an oxidation degree of 64 percent determined by the borohydride method (J.C. Rankin and C.L. Mehltretter, loc. cit.).

A 2.75 g (dry basis) aliquot of the periodate oxidized polygalacturonic acid is suspended in a mixture of 136 ml of water, 15.3 g of commercial grade sodium chlorite (80 percent) and 4.1 ml of glacial acetic acid. The suspension is stirred for 4 hrs at room temperature. After this reaction period, nitrogen is bubbled through the reaction mixture to remove the chlorine dioxide. The pH of the solution is adjusted to 8.3 with aqueous sodium hydroxide (2N) and filtered. The filtrate is poured with stirring into 850 ml of absolute ethanol. The precipitate is dissolved in 25 ml of water and poured into 150 ml of absolute ethanol. The gummy precipitate is dissolved into 75 ml of water and freeze dried to yield the sodium salt of a linear condensation copolymer containing 1,4-linked anhydro-alpha-D-galacturonopyranose units and 1,4-linked anhydro-1,4-dihydroxy-1,3,4-tricarboxy-2-oxabutane units with a milli-equivalent COONa/g : 9.37 and an intrinsic viscosity $[\eta]$ : 0.14 (in 0.2 N NaOH at 30.3° C) expressed in deciliter per gram.

EXAMPLE 10

A solution of 7.9 g of sodium metaperiodate in 150 ml of water is added with stirring to a solution of 4.6 g of alginic acid in 50 ml of water. The solution is stirred in the dark at 0° C under nitrogen atmosphere. At regular intervals the consumption of periodate is determined by the method of P.F. Fleury and J. Lange (J. Pharm. Chim., loc.cit.). As soon as the periodate concentration is stabilized (i.e., after 23 hrs) the residual periodate is reduced by addition of an equivalent amount of ethylene glycol. After a 3 hours reaction period, the solution is dialyzed against water at 5° C, concentrated under reduced pressure at 15° C to a volume of 100 ml. By addition of 250 ml of t-butylalcohol, there is obtained a precipitate which is triturated with absolute ethanol, filtered and dried under reduced pressure to yield periodate oxidized alginic acid having an oxidation degree of 58.6 percent determined by the sodium borohydride method (J.C. Rankin and C.L. Mehltretter, loc. cit.).

A 2.7 g (dry basis) aliquot of the periodate oxidized alginic acid is suspended in a mixture of 80 ml of water, 9 g of commercial grade sodium chlorite (80 percent) and 2.4 ml of glacial acetic acid. The suspension is stirred for 3 hrs at room temperature. After this reaction period nitrogen is bubbled through the reaction mixture to remove the chlorine dioxide. The pH of the solution is adjusted to 8.3 with aqueous sodium hydroxide (2N) and filtered. The filtrate is poured with stirring into 400 ml of absolute ethanol.

The precipitate is dissolved in 16 ml of water and poured into 200 ml of absolute ethanol. The gummy precipitate is dissolved in 120 ml of water and freeze dried to yield the sodium salt of a linear condensation copolymer containing 1,4-linked anhydro-beta-D-mannuronopyranose units, 1,4-linked anhydro-alpha-L-guluronopyranose units and 1,4-linked anhydro-1,4-dihydroxy-1,3,4-tricarboxy-2-oxabutane units with a milli-equivalent COONa/g : 9.00 and an intrinsic viscosity

[η] : 0.23 (in 0.2 N NaOH at 30.3° C) expressed in deciliter per gram.

EXAMPLE 11

To a solution of 10.6 g of sodium metaperiodate in 250 ml of water there is added 5 g of powdered cellulose. The slurry is shaken in the dark at room temperature under nitrogen atmosphere. At regular intervals the periodate is determined by the method of P.F. Fleury and J. Lange (J. Pharm. Chim., loc. cit.). After a 84 hours reaction period, the oxidized cellulose is filtered on fritted glass, washed with water until free of iodate and then with absolute ethanol. The precipitate is dried over phosphorous pentoxide at room temperature under reduced pressure to yield periodate oxidized cellulose with an oxidation degree of 88 percent determined by the oxime method (E.K. Gladding et al., loc. cit.).

A 1 g (dry basis) aliquot of the periodate oxidized cellulose is suspended in a mixture of 50 ml of water, 5.62 g of commercial sodium chlorite (80 percent) and 1.5 ml of glacial acetic acid.

The suspension is stirred for 3 hrs at room temperature. After this reaction period, nitrogen is bubbled through the reaction medium to remove the chlorine dioxide. The reaction mixture is poured with stirring into 250 ml of absolute ethanol. The precipitate is filtered, washed with absolute ethanol and dried.

In order to avoid degradation of the obtained product in alkaline medium, the residual aldehyde functions are reduced with sodium borohydride. Therefore, a 1 g aliquot is suspended in 50 ml of a 0.112 M aqueous solution of sodium borohydride. The reaction mixture is shaken for 20 hrs at room temperature. After this reaction period, the pH is adjusted to 5.5 with acetic acid.

The acidified suspension is poured with stirring into 200 ml of absolute ethanol. The precipitate is suspended into 100 ml of water and the pH of the suspension is adjusted to 8.3 with aqueous sodium hydroxide (2N). The suspension is filtered on fritted glass and the filtrate is dialyzed against water. The dialysate is freeze dried to yield the sodium salt of a linear condensation copolymer containing 1,4-linked-beta-D-glucopyranose units and 1,4-linked anhydro-1,4-dihydroxy-1,4-dicarboxy-3-hydroxymethyl-2-oxabutane units with a milliequivalent COONa/g : 7.7 and an intrinsic viscosity [η] : 0.249 (in 0.2 N NaOH at 30.3° C) expressed in deciliter per gram.

EXAMPLE 12

A solution of 24.8 g of sodium metaperiodate in 225 ml of water is added to a stirred suspension of 7.5 g of amylose (dry basis) in 75 ml of water. The pH of the medium is adjusted to 1 with normal hydrochloric acid.

The slurry is stirred in the dark at room temperature under nitrogen atmosphere. At regular intervals, the consumption of periodate is determined by the method of P.F. Fleury and J. Lange (J. Pharm. Chim., loc. cit.).

After a 3 hours reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 82.2 percent determined by the oxime method (E.K. Gladding et al., loc. cit.).

A 2.37 g (dry basis) aliquot of the periodate oxidized amylose is suspended in 26.5 ml of carbon tetrachloride containing 42.55 g of dinitrogen tetroxide. The suspension is stirred for 24 hrs at 20° C. After this reaction period, the medium is filtered, the precipitate is washed with carbon tetrachloride and suspended in 150 ml of water. The pH of the suspension is adjusted to 9 by addition of sodium hydroxide. After heating on a steam bath for 10 minutes, a clear solution is obtained. The pH of the solution is adjusted to 8.3 and the solution is poured with stirring into 2100 ml of absolute ethanol. The precipitate is dissolved in 200 ml of water and the filtrate is dialyzed against water. The dialysate is freeze dried to yield the sodium salt of a linear condensation copolymer containing 1,4-linked anhydro-alpha-D-glucopyranose units and 1,4-linked anhydro-1,4-dihydroxy-1,4-dicarboxy-3-hydroxymethyl-2-oxa-butane units with a milliequivalent COONa/g : 8.3 and an intrinsic viscosity [η] : 0.05 (in 0.2 N NaOH at 30.3° C) expressed in deciliter per gram.

EXAMPLE 13

Dextran (5 g) having an average molecular weight (weight) of 150,000 is dissolved in a solution of 16 g of sodium metaperiodate in 375 ml of a sodium acetate/hydrochloric acid buffer at pH 3.6.

The solution is stirred in the dark at 0° C under nitrogen atmosphere. At regular intervals, the consumption of periodate is determined by the method of P.F. F. Fleury and J. Lange (J. Pharm. Chim., loc. cit.). As soon as the periodate concentration is stabilized (i.e., after 24 hrs), the residual periodate is reduced by addition of an equivalent amount of ethylene glycol. After a 3 hours reaction period, the solution is dialyzed against water at 5° C, concentrated under reduced pressure at 15° C to a volume of 85 ml. By addition of 250 ml of t-butylalcohol, there is obtained a precipitate which is triturated with absolute ethanol, filtered and dried under reduced pressure to yield periodate oxidized dextran having an oxidation degree of 91 percent, determined by the oxime method (E.K. Gladding et al., loc. cit.).

A 2.72 g (dry basis) aliquot of the periodate oxidized dextran is suspended in a mixture of 200 ml of water, 22.50 g of commercial grade sodium chlorite (80 percent) and 6 ml of glacial acetic acid. The suspension is stirred for 4 hrs at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 1 l of absolute ethanol, the precipitate is dissolved in 45 ml of water and poured into 270 ml of absolute ethanol. The gummy precipitate is dissolved in 75 ml of water, and freeze dried to yield the sodium salt of a condensation copolymer containing 1,6-linked-alpha-D-glucopyranose units and 1,4-linked-anhydro-1,4-dihydroxy-1,3-dicarboxy-2-oxabutane units with a milli-equivalent COONa/g : 9.037 and an intrinsic viscosity [η] : 0.66 (in 0.2 N NaOH at 30.3° C) expressed in deciliter per gram.

EXAMPLE 14

Dextran (5 g) having an average molecular weight (weight) of 500,000 is dissolved in a solution of 16 g of sodium metaperiodate in 375 ml of a sodium acetate/hydrochloric acid buffer at pH 3.6.

The solution is stirred in the dark at 0° C under nitrogen atmosphere. At regular intervals, the consumption of periodate is determined by the method of P.F. Fleury and J. Lange (J. Pharm. Chim. loc. cit.). As soon as the periodate concentration is stabilized (i.e., after 24 hrs), the residual periodate is reduced by addition of an equivalent amount of ethylene glycol. After a 3 hours reaction period, the solution is dialyzed against water at 5° C, concentrated under reduced pressure at 15° C to a volume of 75 ml. By addition of 400 ml of t-butylalcohol there is obtained a precipitate which is triturated with absolute ethanol, filtered and dried under reduced pressure to yield periodate oxidized dextran having an oxidation degree of 89.5 percent, determined by the oxime method (E.K. Gladding et al., loc. cit.).

A 2.75 g (dry basis) aliquot of the periodate oxidized dextran is suspended in a mixture of 200 ml of water, 22.5 g of commercial grade sodium chlorite (80 percent) and 6 ml of glacial acetic acid. The suspension is stirred for 4 hrs at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 1 l of absolute ethanol, the precipitate is dissolved in 50 ml of water and poured into 400 ml of absolute ethanol. The gummy precipitate is dissolved in 75 ml of water and freeze dried to yield the sodium salt of a condensation copolymer containing 1,6-linked-alpha-D-glucopyranose units and 1,4-linked-anhydro-1,4-dihydroxy-1,3-dicarboxy-2-oxabutane units with a milli-equivalent COONa/g : 8.8 and an intrinsic viscosity [$\eta$] : 1.13 (in 0.2 N NaOH at 30.3° C) expressed in deciliter per gram.

EXAMPLE 15

Dextran (5 g) having an average molecular weight (weight) of 2,000,000 is dissolved in a solution of 16 g of sodium metaperiodate in 375 ml of a sodium acetate/hydrochloric acid buffer at pH 3.6.

The solution is stirred in the dark at 0° C under nitrogen atmosphere. At regular intervals, the consumption of periodate is determined by the method of P.F. Fleury and J. Lange (J. Pharm. Chim., loc. cit.). As soon as the periodate concentration is stabilized (i.e., after 24 hrs), the residual periodate is reduced by addition of an equivalent amount of ethylene glycol. After a 3 hours reaction period, the solution is dialyzed against water at 5° C, concentrated under reduced pressure at 15° C to a volume of 75 ml. By addition of 400 ml of t-butylalcohol, there is obtained a precipitate which is triturated with absolute ethanol, filtered and dried under reduced pressure to yield periodate oxidized dextran having an oxidation degree of 84 percent, determined by the oxime method (F.K. Gladding et al., loc. cit.).

A 2.8 g (dry basis) aliquot of the periodate oxidized dextran is suspended in a mixture of 200 ml of water, 22.5 g of commercial grade sodium chlorite (80 percent) and 6 ml of glacial acetic acid. The suspension is stirred for 4 hrs at room temperature. After this reaction period nitrogen is bubbled through the reaction mixture to remove the chlorine dioxide. The pH of the solution is adjusted to 8.3 with aqueous sodium hydroxide (2N) and filtered. The filtrate is poured with stirring into 1 l of absolute ethanol, the precipitate is dissolved in 70 ml of water and poured into 400 ml of absolute ethanol. The gummy precipitate is dissolved in 75 ml of water and freeze dried to yield the sodium salt of a condensation copolymer containing 1,6-linked-alpha-D-glucopyranose units and 1,4-linked-anhydro-1,4-dihydroxy-1,3-dicarboxy-2-oxabutane units with a milli-equivalent COONa/g : 8.44 and an intrinsic viscosity [$\eta$] : 1.29 (in 0.2 N NaOH at 30.3° C) expressed in deciliter per gram.

EXAMPLE 16

To a solution of 3.52 g of sodium metaperiodate in 200 ml of water there is added one gram of guaran (dry basis) prepared from guar flour by the method of R.L. Whistler and J.W. Marx (Methods in Carbohydrate Chem. V, 143, 1965). The pH of the medium is adjusted to 1.6 with normal hydrochloric acid and stirred in the dark at room temperature under nitrogen atmosphere. At regular intervals the consumption of periodate is determined by the method of P.F. Fleury and J. Lange (J. Pharm. Chim., loc. cit.). As soon as the periodate concentration is stabilized (i.e., after 3 ½ hrs) the solution is dialyzed against water at 5° C, concentrated under reduced pressure at 15° C and freeze dried to yield periodate oxidized guaran having an oxidation degree of 88 percent determined by the oxime method (E.K. Gladding et al., loc. cit.).

A 500 mg (dry basis) aliquot of the periodate oxidized guaran is suspended in a mixture of 50 ml of water, 5.62 g of commercial grade sodium chlorite (80 percent) and 1.5 ml of glacial acetic acid. The suspension is stirred for 4 hrs at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 500 ml of absolute ethanol. The precipitate is dissolved in 30 ml water and poured into 210 ml of absolute ethanol. The precipitate is collected and dried to yield a condensation copolymer consisting of a linear chain of 1,4-linked anhydro-beta-D-mannopyranose units and 1,4-linked anhydro-1,4-dihydroxy-1,4-dicarboxy-3-hydroxy-methyl-2-oxabutane units with alpha-D-galactopyranosyl- and 4-hydroxy-1,3-dicarboxy-2-oxabutyl units as substituants of half of the hydroxymethyl functions of the main chain.

EXAMPLE 17

| Ingredients | mg/capsule |
|---|---|
| oxidized amylose as obtained in example 1 | 500 |
| magnesium stearate | 20 |

The above ingredients are thoroughly mixed and filtered through a ASTM No 50 screen into a No 0 hard gelatin capsule, the volume being if desired adjusted with lactose or another classical inert ingredient as it is well known to the art.

The prophylactic dose is from about 4 to about 10 capsules.

EXAMPLE 18

A 10 g sample of oxidized amylose as obtained in example 1 is sterilized and divided into 40 (5 ml) vials.

For subcutaneous administration, the content of one vial is dissolved in 5 ml of sterile phosphate buffered saline (NaCl 8 g, KCl 0,20 g, Na$_2$HPO$_4$ 12 aq 2.89 g, KH$_2$PO$_4$ 0.2 g, pyrogen free distilled water up to 1 l).

The prophylactic dose for adults is one injection a day from about 4 to about 8 days.

EXAMPLE 19

Oxidized amylose as obtained in example I (500 mg) is dissolved in 10 ml of sterile phosphate buffered saline (NaCl 8 g, KCl 0.20 g, Na$_2$HPO$_4$ 12 aq 2.89 g, KH$_2$PO$_4$ 0.2 g, pyrogen free distilled water up to 1 l). The solution is sterilized by filtration into a sterile vial.

The dose is two drops from 3 to 5 times a day in each conjunctival sac or in each nostril.

EXAMPLE 20

Oxidized amylose as obtained in example I (100 mg) is dissolved in 10 ml of sterile phosphate buffered saline (NaCl 8 g, KCl 0.20 g, Na$_2$HPO$_4$ 12 aq 2.89 g, KH$_2$PO$_4$ 0.2 g, pyrogen free distilled water up to 1 l). The solution is sterilized by filtration into a sterile plastic vaporizing vial.

The dose is from 3 to 5 vaporizations a day in each nostril.

EXAMPLE 21

Oxidized amylose as obtained in example I (100 mg) is dissolved in 2 ml of sterile phosphate buffered saline (NaCl 8 g, KCl 0.20 g, Na$_2$HPO$_4$ 12 aq 2.89 g, KH$_2$PO$_4$ 0.2 g, pyrogen free distilled water up to 1 l).

The solution is added to a single dose of lyophilized killed influenza vaccine and the composition is administered by the intramuscular route.

What we claim is :

1. A method of preventing influenza, herpes, or vaccinia infections comprising administering to a susceptible warm-blooded animal an antiviral effective but nontoxic amount of an oxidized amylose, amylopectin, cellulose, alginic acid, polygalacturonic acid, or dextran, said oxidized compound having one of the following formulas and a molecular weight of at least 5000:

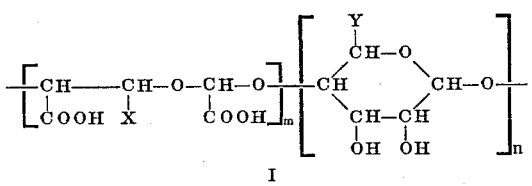

I

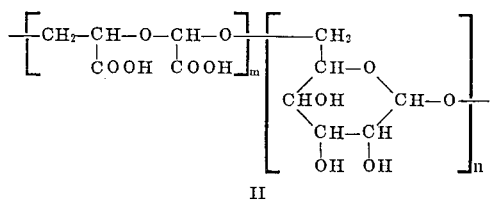

where X and Y are each $CH_2OH$ or $COOH$,
$m$ is between 0.6 and 1, and
$n = 1-m$.

2. A method according to claim 1 wherein the oxidized compound is amylopectin.

3. A method according to claim 1 wherein the oxidized compound is cellulose.

4. A method according to claim 1 wherein the oxidized compound is alginic acid.

5. A method according to claim 1 wherein the oxidized compound is dextran.

6. A method according to claim 1 wherein the oxidized compound is amylose.

7. A method as claimed in claim 6, in which the viral infection is influenza.

8. An antiinfectious composition comprising from 100 to 500 mg. of a compound as defined in claim 1 plus a pharmaceutical carrier.

9. A composition according to claim 8 wherein the compound is oxidized amylose.

* * * * *